US009174396B2

(12) United States Patent
Iskanderova et al.

(10) Patent No.: US 9,174,396 B2
(45) Date of Patent: Nov. 3, 2015

(54) METHOD OF MAKING CHARGE DISSIPATIVE SURFACES OF POLYMERIC MATERIALS WITH LOW TEMPERATURE DEPENDENCE OF SURFACE RESISTIVITY AND LOW RF LOSS

(71) Applicants: Integrity Testing Laboratory Inc., Markham (CA); Macdonald, Dettwiler and Associates Corporation, Ste-Anne-de-Bellevue (CA)

(72) Inventors: Zelina Iskanderova, Toronto (CA); Jacob I. Kleiman, Thornhill (CA); François Bussières, Notre-Dame-de-l'Ile-Perrot (CA)

(73) Assignees: INTEGRITY TESTING LABORATORY INC., Markham, Ontario (CA); MACDONALD, DETTWILER AND ASSOCIATES CORPORATION, Ste-Anne-de-Bellevue, Quebec (CA)

( * ) Notice: Subject to any disclaimer, the term of this patent is extended or adjusted under 35 U.S.C. 154(b) by 117 days.

(21) Appl. No.: 13/934,573

(22) Filed: Jul. 3, 2013

(65) Prior Publication Data

US 2013/0295413 A1 Nov. 7, 2013

Related U.S. Application Data

(63) Continuation-in-part of application No. 12/458,486, filed on Jul. 14, 2009, now abandoned.

(60) Provisional application No. 61/129,709, filed on Jul. 14, 2008.

(51) Int. Cl.
| C23C 14/28 | (2006.01) |
| B05D 3/06 | (2006.01) |
| B29C 71/04 | (2006.01) |
| B29C 59/16 | (2006.01) |
| B29L 31/34 | (2006.01) |
| B29C 35/08 | (2006.01) |

(52) U.S. Cl.
CPC ............. *B29C 71/04* (2013.01); *B29C 59/16* (2013.01); *B29C 2035/0872* (2013.01); *B29C 2791/006* (2013.01); *B29K 2995/0003* (2013.01); *B29L 2031/3456* (2013.01)

(58) Field of Classification Search
CPC ................................ B29C 71/04; B29C 59/16
See application file for complete search history.

(56) References Cited

U.S. PATENT DOCUMENTS

| 3,808,963 | A | | 5/1974 | Ludena | |
| 4,199,650 | A | * | 4/1980 | Mirtich et al. | 428/421 |
| 4,300,444 | A | | 11/1981 | Muse | |
| 5,683,757 | A | * | 11/1997 | Iskanderova et al. | 427/525 |
| 6,196,120 | B1 | | 3/2001 | Reames | |
| 6,439,107 | B1 | | 8/2002 | Bourgeois | |
| 7,208,702 | B2 | | 4/2007 | Choi | |
| 2005/0217494 | A1 | | 10/2005 | Hrushowy | |
| 2010/0024666 | A1 | | 2/2010 | Lee | |
| 2011/0000380 | A1 | | 1/2011 | Jamison | |

OTHER PUBLICATIONS

Barchman et al , Ion bombardment of polyimid films, J. Vac. Sci Technol. A, Jul./Aug. 1989, 7(4) p. 2709-2716.*
Marietta et al, ESCA and REELS characterization of electrically conductive polyimide obtained by ion bombardment in the keV range, surface and interface analysis, 1988, vol. 12 p. 447-454.*
Nanayakkara L.D. Somasiri, et al, "A Process . . . Metals", IEEE Transactions Components, Hybrids, and Manuf. Technology, vol. 14, No. 4, Dec. 1991, pp. 798-801, USA.
Lee, E.H., et al, "Ion Beam . . . Surface Properties", Nuclear Instruments and Methods in Physics Research, B74, 1993, pp. 326-330, North Holland, Holland.
Zussman, M.P., et al, "Modification of Polyimide . . . Ion Bombardment", Journal of Applied Polymer Science, vol. 35, pp. 2183-2191, 1988, John Wiley & Sons, Inc., USA.
Ektessabi, A.M., et al, "XPS Study . . . Polyimide Films", Thin Solid Films 377-378, 2000, pp. 621-625, Elsevier Science B.V., Holland.
Salvetat, J-P., et al, "Onset and Growth . . . Heavy-Ion Irradiation", The American Physical Society, vol. 55, No. 10, 1997, pp. 6238-6248, USA.
Svorcik, V., et al, "Nitrogen Implantation into Polyimide", European Pölymer Journal, vol. 31, Issue 2,1995, p. 189-191, Elsevier Science Ltd., U.K.
Guenther, M., et al, "Influence . . . Moisture Uptake", Surface and Coatings Technology, vol. 142-144, 2001, pp. 482-488, Elseiver Science B.V., Holland.
Davenas, J., et al, "The Multi-aspects . . . of Insulators", Nuclear Instruments and Methods in Physics Research, B80-81, 1993, pp. 1021-1027, Elsevier B.V., Holland.
Davenas, J., et al, "Role of the . . . of Polyimide", Nuclear Instruments and Methods in Physics Research, B32, 1988, pp. 136-141, Elsevier B.V., Holland.
Loh, I.H., et al, "Conducting Polymers by Ion Implantation", Nuclear Instruments and Methods in Physics Research, B34, 1988, pp. 337-346, Elsevier B.V., Holland.
Dong, H., et al, "State-of-the-Art . . . Tribological Properties", Surface and Coatings Technology, vol. 111, Issue 1, 1999, pp. 29-40, Elseiver Science S.A., Switzerland.

* cited by examiner

*Primary Examiner* — Dah-Wei D Yuan
*Assistant Examiner* — Nga Leung V Law
(74) *Attorney, Agent, or Firm* — Equinox IP; Franz Bonsang

(57) ABSTRACT

A method of making a charge dissipative surface of a dielectric polymeric material with tunable (selectable) surface resistivity, comprises the step of controllably carbonizing the surface of the polymeric material in a vacuum environment by bombarding the polymeric surface with an ion beam of rare gas ions, the energy level of the ion source being from 2.5 to 30 keV, in the fluence range 1E16-5E17 ion/cm$^2$ so as to reach a surface resistivity in the static dissipative range of 1E6 to 1E9 ohm/square at room temperature, with a temperature dependence of less than three orders of magnitude between −150° C. and +150° C., while having no impact on the RF performance of the material, with high RF power handling capability, and with tunable thermo-optical properties of the surface, including negligible impact on the thermo-optical properties and RF performance of the material, if required by applications.

7 Claims, 5 Drawing Sheets

METHOD OF MAKING CHARGE DISSIPATIVE SURFACES OF POLYMERIC MATERIALS WITH LOW TEMPERATURE DEPENDENCE OF SURFACE RESISTIVITY AND LOW RF LOSS

CROSS REFERENCE TO RELATED APPLICATIONS

This application is a Continuation-In-Part of, U.S. patent application Ser. No. 12/458,486, filed on Jul. 14, 2009 and published under Publication No. US 2010/0009194 A1, which claimed benefit of priority of U.S. Provisional Patent Application Ser. No. 61/129,709, filed on Jul. 14, 2008, both of which being incorporated herein by reference.

FIELD OF THE INVENTION

The present invention relates to the field of polymeric surface treatment, and more particularly to a method of making charge dissipative surfaces of dielectric polymeric materials with low temperature dependence of surface resistivity over a wide temperature range, such as the one that can be seen for antennas in space, with high RF (Radio-frequency) transparency and/or with negligible impact on thermo-optical properties of the surface.

BACKGROUND OF THE INVENTION

Ion implantation and/or ion bombardment is of growing interest in polymer science and engineering because of its demonstrated capability to modify the molecular structure, surface morphology and physical properties of polymers. During ion bombardment of polymers in vacuum at a wide range of conditions, the most common are the processes of polymer cross-linking or chain destruction due to energy transfer at atomic collisions and with following volatile final products release from the surface of the polymer, surface carbon content increase, called surface carbonization, and subsequent surface reconstruction. Changes in the index of refraction, optical transmission and reflection, and other optical properties of polymer films, as well as adhesion enhancement of coatings have been shown to follow ion implantation and ion bombardment of polymeric surface(s). Those are typically of significant impact, especially when used in space applications such as on spacecrafts, in order to control the mechanical and thermal optical performances of the material or the equipment on board. There may be a significant increase in density as a result of volume and density changes due to surface carbonization, accompanying ion implantation of polymers, mechanical, optical/electrical properties change (such as surface hardness, wear resistance, oxidation resistance, electrical conductivity). Some research studies were done to identify the mechanisms of ion beams interaction with polymeric surfaces and properties change, such as improvement of adhesion of polymers to metals or metals to polymers, etc. Some patents also discloses some work on ion implantation/ion bombardment on polymeric surfaces, such as U.S. Pat. No. 4,199,650 to Mirtich et al. granted on Apr. 22, 1980, U.S. Pat. No. 4,957,602 to Binder et al. granted on Sep. 18, 1990, U.S. Pat. No. 5,130,161 to Mansur et al. granted on Jul. 14, 1992, U.S. Pat. No. 6,248,409 to Kim granted on Jun. 19, 2001, U.S. Pat. No. 6,787,441 to Koh et al. granted on Sep. 7, 2004, and U.S. Pat. No. 7,309,405 to Cho et al. granted on Dec. 18, 2007.

However, none of the existing prior art discloses nor even suggests any studies made to develop a method of ion beam treatment of thin dielectric polymer films, and a product made by this method, to provide ESD (electrostatic discharge) protection while minimize impact on RF performance, for example, for space antenna sunshields or for any other relevant space applications. In this regard, it is important to mention that surface carbonization of polymers by ion beams or, in short, "surface carbonization", is a very wide phenomenon and associated term. It covers a wide range of degree(s) of carbonization, from few percent of exceeding carbon concentration up to almost full "graphitization", with significantly variable amount of chemical bonding reconstruction, such as from $sp^2$ to $sp^3$ carbon bonding states, in polymeric surfaces and subsurface regions, depending on a variety of ion bombardment conditions. The treated surface layers may be very different in composition, structural specifics and final properties. Furthermore, due to variable degrees of carbonization, various thickness of the modified subsurface layers, final change of elemental chemical composition and chemical bonding re-structuring, also depends on the temperature during bombardment and can be identified by advanced surface analysis methods. Therefore final functional properties of the treated surface, such as surface resistivity. RF transparency, and radiation resistance can vary drastically. It is therefore essential to measure and control the desired functional properties (RF transparency, surface resistivity, durability in space environment, etc.) in order to find a special way of treating the material and to define the proper process parameters to get the desired properties. These properties are not inherent to the general process of ion beam treatment of dielectric polymers (or surface carbonization) and cannot be predicted by one skilled in the art without significant research and trials in order to develop a new surface treatment method.

When antenna applications in space are considered and that a dielectric film is required in the RF field (for example sunshields in front of the radiating element and/or reflector of communication antennas), the material needs to fulfill few specific and, to some extends, conflicting requirements. It needs to be RF transparent, or permeable as much as possible, to prevent signal losses, have good thermo-optical properties to control the temperature excursions of the antenna equipment, and have a charge dissipative surface in the entire space-related temperature range to prevent charging and arcing of polymer films under space radiation environment. It means that electrical surface resistivity (SR) over the entire temperature range should be kept within about $10^5$ to $10^{10}$ ohms/square; SR to be above about $10^5$-$10^6$ ohms/sq. for RF transparency and below $10^9$-$10^{10}$ ohms/sq. to avoid ESD (electrostatic discharge) issues. This demonstrates the importance to have as low as possible temperature dependence of the surface resistivity to dissipate electrical charges without disturbing RF performance. It is also required to ensure that these properties do not degrade too much over time when those materials are exposed for years in a specified space environment, for instance, such as geosynchronous Earth orbit (GEO) space environment, that includes UV (ultraviolet), ionizing radiations, i.e. energetic protons and electrons, and thermal cycling in vacuum.

There are different ways of providing ESD (electrostatic discharge) protection to surfaces of dielectric-type materials in order to prevent charge buildups followed by damaging discharges on electrically sensitive surfaces, especially when dealing with active components such as antennas, electronics and the like, in space applications.

One of the ways used is to apply semiconductor-based thin coatings, such as silicon (Si) or germanium (Ge) under vacuum deposition processes, on the required surfaces. Such coatings have a tendency to provide for a significantly varying surface resistivity over space-related temperature ranges, from about −150° C. to about +150° C., as can be encountered in space applications, with a generally too high SR at low end temperatures to achieve proper ESD protection. Furthermore, such coatings are known to be fragile or brittle (not robust), thus requiring careful handling, and may be sensitive to humidity level (mostly germanium).

Another known way is the application of an electrically conductive coating, such as indium-tin oxide (ITO), as in U.S. Pat. No. 5,283,592 granted on Feb. 1, 1994 to Bogorad et al. for an "Antenna Sunshield Membrane". Disadvantages of this ITO coating is that, beside that it is also fragile (susceptible to cracking), it is too electrically conductive to be considered when RF transparency (or semi-transparency) is needed for a space antenna sunshield, especially in modern high-frequency applications or the like, as it behaves as a barrier to RF signals.

Another way of decreasing the SR of dielectric materials is to load the material with electrically conductive particles such as carbon or the like, as in U.S. Pat. No. 6,139,943 granted on Oct. 31, 2001 to Long et al. for a "Black Thermal Control Film and Thermally Controlled Microwave Device Containing Porous Carbon Pigments". This loading of particles into the material significantly affects its mechanical and thermo-optical properties, as well as its RF transparency in high frequencies, which considerably limit and essentially hinder its use in most modern space antenna applications.

Early sunshield consisted of Kapton™ dielectric sheet painted white, but the properties degraded over time on-orbit, decreasing thermal protection, and increasing RF signal loss. For ITO-coated white paint on black Kapton™ film and ITO-coated clear Kapton™ film with white paint on the second surface, RF losses in the frequency range 2.5 to 15 GHz were known to be on the order of 0.2 dB (decibel), which was not acceptable for operation with current high power signals requirements at Ku-band frequencies and above.

U.S. Pat. No. 5,373,305 granted on Dec. 13, 1994 to Lepore, Jr. et al. offers as an improved sunshield a pigmented flexible film of 0.0005 to 0.003 inch thick with germanium thin coating, vacuum deposited on the space-facing side. Black-pigmented polyimide substrate (KaptonC™ pigmented with carbon black) was preferred, as solar transmittance is virtually zero. The RF loss for uncoated polyimide or polyetherimide film is quoted as being less than 0.02 dB over the 2.5 to 15 GHz frequency range. The proposed black polyimide membrane sunshield construction adds another 0.03 dB for an RF loss of up to 0.05 dB at 15 GHz. Increased loss is expected when using carbon black for pigmentation. Moreover, the electrical conductivity of germanium (and the like semi-conductor coatings such as silicon) decreases at cold yielding to inadequate ESD protection at cold temperature and increases at hot temperatures yielding to higher RF losses and even possibly to a thermal runaway under high RF power signal densities travelling there through. This type of sunshield is therefore not promising for high-power and/or high-frequency operation, particularly in and above Ku-band and Ka-band frequencies, used in nowadays modern applications.

Accordingly, there is a need for an improved charge dissipative surface of a dielectric polymeric materials, such as, for example, space polymer films, with low temperature dependence of surface resistivity while keeping unchanged RF performance thereof, and a method of making that surface on space polymers.

SUMMARY OF THE INVENTION

It is therefore a general object of the present invention to provide an improved charge dissipative surface of a dielectric polymeric material, preferably with low temperature dependence of the required surface resistivity, without affecting RF performance, and with tunable thermal optical properties, including unchanged thermal optical properties thereof, and a method of making that surface.

An advantage of the present invention is that a method was established to make a charge dissipative surface of polymeric material with required SR at room temperature ($10^6$ to $10^9$ ohms/sq.) and with comparatively low temperature dependence, such that SR typically remains within 2-3 orders of magnitude variation (100-1000 ratio factor) over a wide space-related temperature range of +/−150° C., by controlling the carbonization of a thin external layer of the surface using ion-beam surface treatment. The surface treatment preferably to be done in vacuum by ion beams of rare gases at specially defined conditions, without affecting any properties of the polymeric material underneath.

Another advantage of the present invention is that the method of making the charge dissipative RF transmitting polymeric surface can be performed to achieve tunable thermal optical properties in a way to decrease the solar transparency of the film, depending on what is desired.

A further significant advantage of the present invention is that the method of making the charge dissipative RF transmitting polymeric surface allows providing a particular desired surface resistivity in the charge dissipative range at RT, that can be controlled within a few orders of magnitude by special selection of treatment conditions. This is a very valuable advantage over the mentioned above thin semi-conductive coatings, that allows to reach just one particular surface resistivity or a very small range of SR by the selection of the material itself and the limited deposited film thickness on thin film polymers.

Still another advantage of the present invention is that the method of making the charge dissipative polymeric surface allows the radio-frequency (RF) permeability of the surface and the material/product to remain essentially unaffected (no measurable difference), even at high Ku- and Ka-band frequencies, and likely even higher frequencies.

Another advantage of this invention is that, since surface resistivity changes less over temperature than in semiconductor coatings, the RF power handling of the material will be significantly higher. Indeed, as the temperature goes up, the conductivity of the material (and thus ohmic losses) increases. At high RF power density, this can create a thermal runaway phenomenon leading to burning of the material (material heating due to RF losses and RF losses increasing with temperature). The RF power density at which the material has a thermal runaway is much higher for material treated as per this invention compared to semiconductor coatings like germanium because the surface resistivity (or conductivity) is less changing over temperature.

Another advantage of the present invention is that the method of making the charge dissipative RF transmitting polymeric surface provides a surface that is very robust, but flexible, i.e. not fragile, and stable over time of storage.

A further advantage of the present invention is that the method of making the charge dissipative polymeric surface is based on a compositional change being "graded" into the material, as opposed to a coating, defining a sharp interface, which is often a weak point of the structure in regard of adhesion suffering due to thermal cycling and thermal shocks.

Yet another advantage of the present invention is that the method of making the charge dissipative polymeric surface provides a surface that is resistant to the space radiation environment, such as at multi-years exposure to the GEO space environment.

According to an aspect of the present invention there is provided a method of making a charge dissipative surface of a dielectric polymeric material with low temperature dependence of the surface resistivity, said method comprising the step of controllably carbonizing the surface of the polymeric material.

Conveniently, the step includes controllably treating the polymeric surface with an ion beam, and preferably by impinging low and/or moderate energy rare gases ion beams at pre-selected treatment conditions (such as selected energy, flux, and fluence, or total dose of the ion beam treatment, as well as the temperature of the polymeric surface), by carbonizing the surface of the polymeric material to a particular degree in a graded manner, forming an inorganic-organic, or carbonized subsurface layer-to-polymeric material graded transition in the ion beam treated subsurface area, to form a charge dissipative surface with a required surface resistivity and low temperature dependence of the surface resistivity, without compromising the RE performance of the material and with tunable thermo-optical properties of the surface, if required according to applications.

According to an aspect of the present invention, there is provided a method of making a charge dissipative and RF transparent surface of a dielectric polymeric material, said method comprising the step of controllably carbonizing the surface of the polymeric material in a vacuum environment through bombardment of the surface with a beam of rare gas ions having an energy between about 2.5 keV and about 30 keV, and a total ion fluence level in the range from about $1\times10^{16}$ ion/cm$^2$ to about $5\times10^{17}$ ion/cm$^2$, at a properly selected treatment temperature, in order to achieve:

a treated carbonized surface layer with a surface resistivity selectable in the charge dissipative range between $1\times10^6$ and $1\times10^9$ ohms/square;

said treated carbonized surface layer being RF transparent.

Conveniently, the rare gas ions are sourced from Argon, Krypton or Xenon.

Conveniently, the polymeric surface is heated up to a temperature varying between about 65° C. and about 95° C. during said bombardment so as to reduce the treatment time and enhance the carbonization quality.

Preferably, the treated carbonized surface layer has a thickness between about 0.02 μm and about 0.2 μm.

Conveniently, the bombardment keeps the carbonized layer RF transparent at RF signal frequencies up to about 40 GHz.

Conveniently, controllably carbonizing the polymeric surface enables to achieve a static-dissipative material surface with an RF signal power handling up to a density of at least about 5.0 MW/m$^2$.

Conveniently, the energy of the rare gas ions, the total fluence and the treatment temperature are selected to form the static dissipative carbonized layer having a variable range hopping conductivity mechanism yielding a temperature dependence of its surface resistivity in the range of less than three orders of magnitude between about −150° C. and about +150° C.

Conveniently, controllably carbonizing the polymeric surface enables to achieve a surface that is resistant to the Geostationary Orbit (GEO) space radiation environment in long-duration missions, up to 15 years.

According to another aspect of the present invention, there is provided a product treated according to the above-mentioned method.

According to a further aspect of the present invention, there is provided a method of making a charge dissipative surface of a dielectric polymeric material with low temperature dependence of the surface resistivity, said method comprising the step of:

controllably carbonizing the surface of the polymeric material in a vacuum environment by bombarding the polymeric surface with a ion beam of rare gas ions, said bombardment forming the charge dissipative surface within a tunable (i.e. selectable) surface resistivity in a static-dissipative range with said low temperature dependence of the surface resistivity over a wide temperature range, without increased RF losses and with high RF power handling of the final material or product.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures in which similar references used in different Figures denote similar components, wherein.

DETAILED DESCRIPTION OF THE PREFERRED EMBODIMENTS

Figure 1:
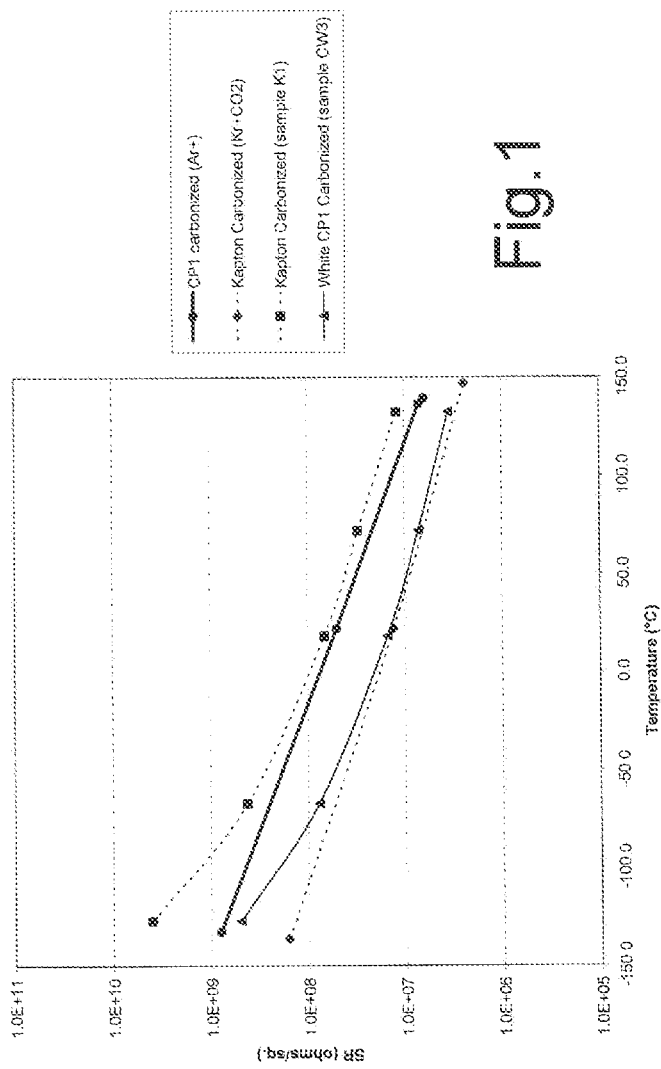
FIG. 1 is a graphical presentation of test results of surface resistivity of charge dissipative polymeric surfaces with low temperature dependence of the surface resistivity in accordance with embodiments of the present invention, showing the measured surface resistivity over a wide space-related temperature range.

With reference to the annexed drawings the preferred embodiment of the present invention will be herein described for indicative purpose and by no means as of limitation.

Surface carbonization by ion beam treatment of a surface of a polymeric material may be performed by a variety of ions, in a wide energy range, and includes a few main processes, such as energy transfer from the accelerated ions to the polymeric surface in atomic collisions, surface sputtering by ion bombardment, volatiles release, and the following surface composition and/or chemical bonding restructuring, phase transformations, etc. The final results are very sensitive to the ion-material combination, ion beam energy and flux, and to the ion beam fluence, i.e. total dose of ions interacting with the surface for the treatment duration. Temperature of the target may increase due to ion bombardment, if using the ion beams of high energy and/or fluxes, or by using an additional heater inside the vacuum chamber, and may also influence the final carbonization and properties after ion beam(s) treatment.

In the case of present invention, the selection of ions and energy range, from rare gases such as typically Ar, Ke or Xe of low (2.5-5 keV—kilo-electron Volt)—and preferably 2.5-3 keV, provided, for instance, by a powerful technological ion beam source, such as low energy linear, or racetrack-like ion beam source for industrial purposed, to moderate (5-50 keV and preferably 8-30 keV) energies was made, based on the inventors extensive knowledge and expertise, as well as the results of computer simulation and modeling, using the TRIM/SRIM (Transport/Stopping-and-Range—of Ions in Matter) computer simulation softwares. These calculations are able to show the energy loss distribution in the bombarded subsurface layer that allows preliminary estimating the thickness of the affected surface layer and the expected carbonized layer depth as a result of the proposed ion beam treatment. Successful results of the formation of a charge dissipative RF transparent carbonized surface layers on polymers, with the depth of about 200-2000 Å (angstroms, or $10^{-10}$ meter)—about 0.02-0.2 μm, and more typically about 200-1000 Å (preferably about 0.02-0.1 μm), have been achieved in the present invention with the ion beams of rare gases ions, such as $Ar^+$, $Kr^+$, and $Xe^+$. In a vacuum environment ($1\times10^{-4}$ torr or less) and at appropriate treatment temperature, those gases are easily migrating to the surface and out-gassed from the polymers during the ion beam treatment, when used at above-mentioned low or medium (moderate) energies and with some mentioned above surface heating, and therefore do not introduce any doping elements (impurities). Ion beam currents/fluxes have been selected in the range of current from low, few μA (micro-Amp), with flux from $(3-5)6\times10^{12}/cm^2/s$, up to the current as high as parts of mA (milli-Amp), and flux from $(0.2-0.3)6\times10^{15}/cm^2/s$ (not to cause overheating of the thin polymer films), and total fluencies have been used in the range from $1\times10^{15}$ ion/$cm^2$ (only for very heavy rare gas ions like Xenon) or preferably $1\times10^{16}$ ion/$cm^2$ (for other rare gas ions such as Argon and the like) up to $(3-5)10^{17}/cm^2$. The surface resistivity decrease was more pronounced by the treatment with heavier ions and higher fluxes due to more extensive energy transfer, and achieved more easily on partially fluorinated polymers, that are more sensitive to ion bombardment. It has been found that going with significantly higher energy of the ions, i.e. acceleration voltage of the ion beam, or significantly higher ion beam currents and ion fluxes, raises significantly the power input in the polymer film, and may most likely cause films destruction/burning or, at least, warping. Going with significantly higher energy would also carbonize a thicker portion of the film, which could result in higher RF losses. Using lower ion beam energies has been shown to limit strongly the ions penetration depth and energy transfer for effective carbonization due to ion bombardment. Using lower ion beam currents, i.e. ion flux values, subsequently increases the treatment time. The treatment has shown to be successful with the polymer films in a temperature range, from room temperature (about 20° C.) up to about 65-95° C., during ion bombardment. The proposed temperature increase in this range allowed enhancing the thermally-activated processes, such as diffusion of gases in polymers, polymeric fragments re-arrangement, and final gaseous products release from the bombarded area, with following volatiles desorption and the polymers surface reconstruction to carbonized, stable, charge dissipative surface layers. One has to be careful not to increase too much the temperature, since it may cause, together with the heating due to the ion beam, an overheating, especially at the final stages of the treatment, therefore causing films destruction/burning or, at least, warping. But on the other hand, decreasing the films treatment heating temperature would result in an increase of the treatment duration for achieving some surface resistivity. This trend clearly indicated the way to increase the production rate, when performing the industrially desired production by roll-to-roll or batch surface treatment of the required space polymer films, providing the charge dissipative surfaces with required surface resistivity from the variable/tunable surface resistivity a wide range of values, as illustrated in Table 1(a) and Table 1(b) herein below. However, when the minimum impact (almost negligible or undetectable) on the thermal-optical properties of the material surface is of concern, with all the other above-mentioned beneficial surface properties to be achieved, the use of medium mass ions, such as $Ar^+$, at the lower energy, such as about 3 keV, and with the polymer films temperature kept around 60-65° C. has been found to be the most preferable.

The use of heavier ions (such as Kr and Xe) and the indicated temperature range during ion beam treatment allowed reducing the treatment time and extending the range of achievable SR values (lower SR in the order of $10^5$ ohms/sq. can be achieved with heavier ions due to increased energy transfer and reconstruction of the surface), that might be beneficial for other possible applications, that enhances the manufacturing feasibility of the method of the present invention and proposed treatment technology.

In summary, the following ranges of parameters are found to be suitable for the method of the present invention of making a charge dissipative surface of a dielectric polymeric material by controlled carbonization thereof by ion beam treatment in a vacuum environment of $1\times10^{-4}$ torr or less, the variation of these parameters providing for the control of the carbonization process:

ion beam energy level: from about 2.5 to 50 keV, and preferably from about 2.5 to 30 keV;

ions of various mass, preferably rare gas ions, such as Ar+, Kr+ and Xe+ ions current level: from about 1 μA up to about 0.5 mA, and preferably from about 3-5 μA up to about 0.2-0.3 mA;

ions total fluence level: from about $10^{15}$ ion/$cm^2$ (only for very heavy rare gas ions like Xenon) and preferably from $10^{16}$ ion/$cm^2$ up to $(3-5)\times10^{17}$ ion/$cm^2$;

treatment duration: from about 10-12 minutes to about 10 hours, and preferably from about 7-8 minutes to about 8 hours, depending on the ion type and flux;

treatment temperature (including pre-heating in vacuum prior to ion bombardment for polymers outgassing and during ion bombardment for carbonization): from about 20° C. to about 95° C., and preferably from about 65° C. to about 95° C.;

With the method of the present invention of making a static-dissipative surface layer on a number of dielectric polymers by controlled carbonization via ion beam treatment of the surface of the polymer, the following characteristics are achievable, depending on the requirement(s):
- a charge dissipative surface that has a low temperature dependence of SR (SR typically remains within a 2-3 order of magnitude variation (100-1000 ratio factor) over a wide temperature range of at least 300° C. span covering in particular the cold and hot temperatures usually encountered in space applications, i.e. between about −150° C. to +150° C., and may keep low temperature dependence on a wider temperature range;
- a static dissipative surface that is robust, and not fragile, but flexible when formed on a polymer film, and typically stable under space radiation for many years;
- an optimized surface resistivity with negligible (not measurable) impact on RF properties of the polymer and the surface itself (RF transparent treatment) up to at least Ka-band frequencies;
- a material with higher RF power handling capability (thermal runaway at high RF power density, such as up to about 500 $W/cm^2$ at Ku-band) compared to static-dissipative semi-conductor coatings like germanium (having a thermal runaway at about 50-150 $W/cm^2$ at Ku-band).
- an optimized surface resistivity with little impact on thermo-optical properties (solar absorptance, solar reflectance (diffuse and directional), IR (infrared) emittance, etc.) of the surface, or with reduced solar transmittance, if required.

Typically, the adjustment of the SR to desired range (within about $10^6$ ohms/sq. up to about $10^9$ ohms/sq. at room temperature) is achieved by controlling the ion-beam treatment parameters (flux and/or energy level of the ion beam, treatment duration, materials temperature, etc.), the stronger and/or longer the treatment is, the lower the obtained SR is, with some natural limitations, when the SR levels up, i.e. becomes independent of further treatment duration.

EXAMPLES

FIG. 1 illustrates the behavior of surface resistivity (SR) measurements with temperature in the range from −140° C. to +140° C. for two surface carbonized samples, namely, CP-1 (partially fluorinated Clear Polyimide manufactured by ManTech SRS Technologies, Inc. from Alabama. U.S.A.) polymer film, treated by $Ar^+$ ion-beam, and Kapton™ 100HN film exposed to $Kr^+$ ion-beam bombardment. It is clear that the temperature dependence of SR-SR(T)—is quite low compared to semi-conductor coatings like germanium and silicon (SR(T) of surface carbonized samples has been shown to be in agreement with the variable range hopping conductivity mechanism, and, therefore varies by 2-3 orders of magnitude (100-1000 ratio factor) over the specified temperature range compared to typically 4-5 orders of magnitude (10,000-100,000 ratio factor) for semiconductor coating of silicon or germanium).

Figure 2:
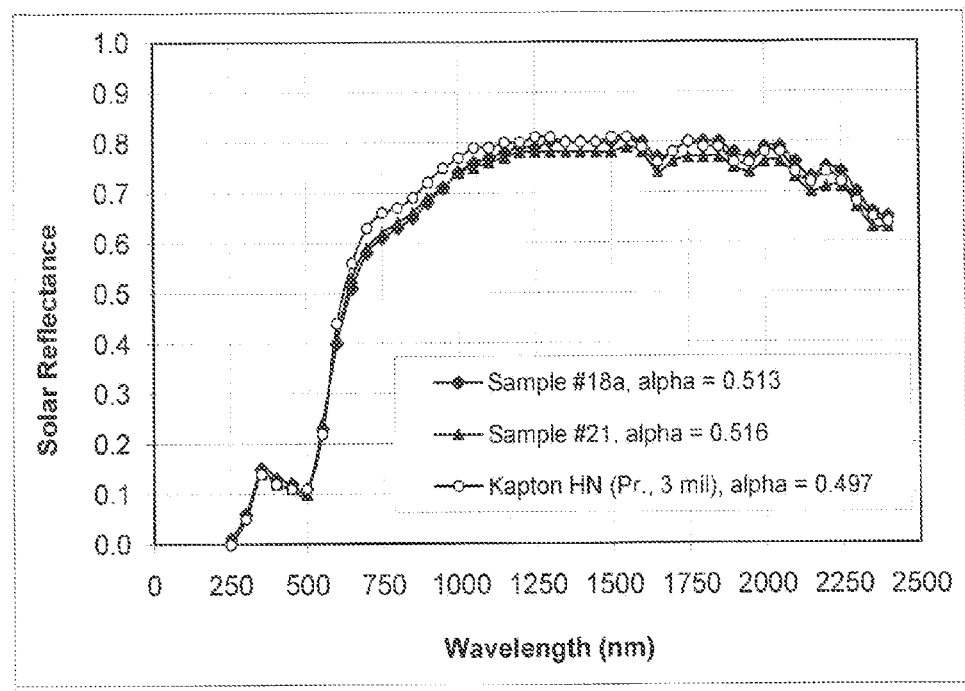
FIG. 2 is a graphical test result of solar reflectance spectra of charge dissipative polymeric surfaces prepared in accordance with embodiments of the present invention, and of a pristine (non-treated) similar reference sample, when measured over a highly polished aluminum backing.

FIG. 2 illustrates the possibility to have a polymer surface with minimum influence of the proposed ion beam treatment on solar reflectance—the most sensitive thermal optical property of a variety of space polymer films. With the surface resistivity in the range 2-3 MΩ/sq. (sample No: 18a of Table 1b) or 10-20 MΩ/sq. (sample No: 21 of Table 1b), solar reflectance change (measured over an aluminum backing) does not exceed 0.02 from a similar pristine non-treated reference sample as can be seen from FIG. 2.

Figure 3:
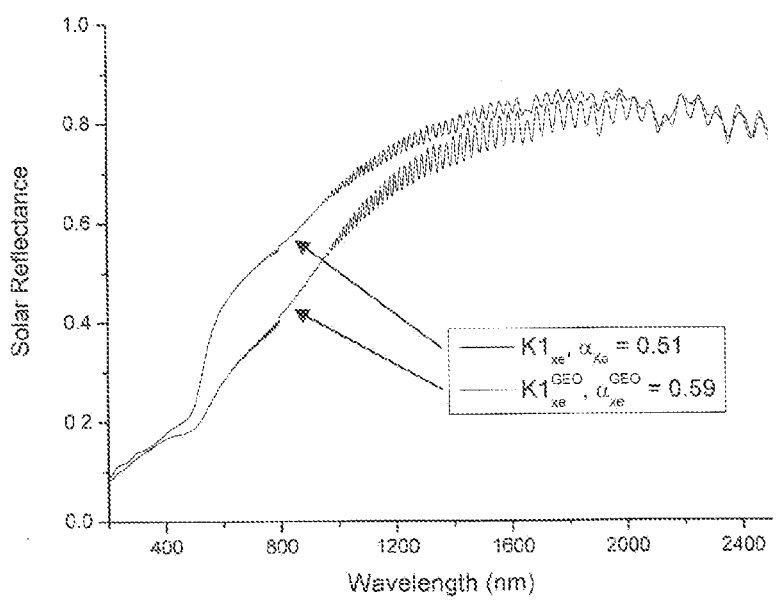
FIG. 3 is a graphical test result of solar reflectance spectra of a space polymer films with charge dissipative polymeric surfaces prepared in accordance with embodiments of the present invention, after testing in a ground-based GEO space environment simulator under conditions of equivalent simultaneous UV, protons, and electrons irradiation, that corresponds to long-term, 5-6 years space flight at GEO environment.

FIG. 3 illustrates the typical outstanding radiation resistance of the charge dissipative Kapton™ HN surface developed by the proposed ion beam treatment of the present invention. Testing was performed at about 20° C. using simultaneously applied three main space radiation factors, such as protons, electrons, and UV, using 20 keV protons with flux level of $10^{11}$ $p^+/cm^2/s$ and fluence level of $1.5\text{-}4.7 \cdot 10^{15}$ $p^+/cm^2$; 10 keV electrons with flux level of $10^{12}$ $e^-/cm^2/s$ and fluence level of $4\text{-}7 \cdot 10^{16}$ $e^-/cm^2$, and UV exposure of one equivalent sun (1 eq.Sun). The conditions for charged particles irradiation have been selected using advanced GEO space environment models similar to NASA™ AP-8 and AE-8 with the goal to complete the imitation of long-term, ~5-6 years in flight GEO exposure in a reasonable timeframe at the ground-based testing. The UV intensity equal to 1 equivalent sun (no accelerated testing) has been chosen not to disturb the chemical structure of the surface layer of thin polymer films by intensive UV radiation, for instance, such as cross-linking. Testing using separate and combined GEO space factors in this facility has convincingly proven that the main damaging factor for space-related thermal control polymer-based materials is proton irradiation.

Figure 4A:
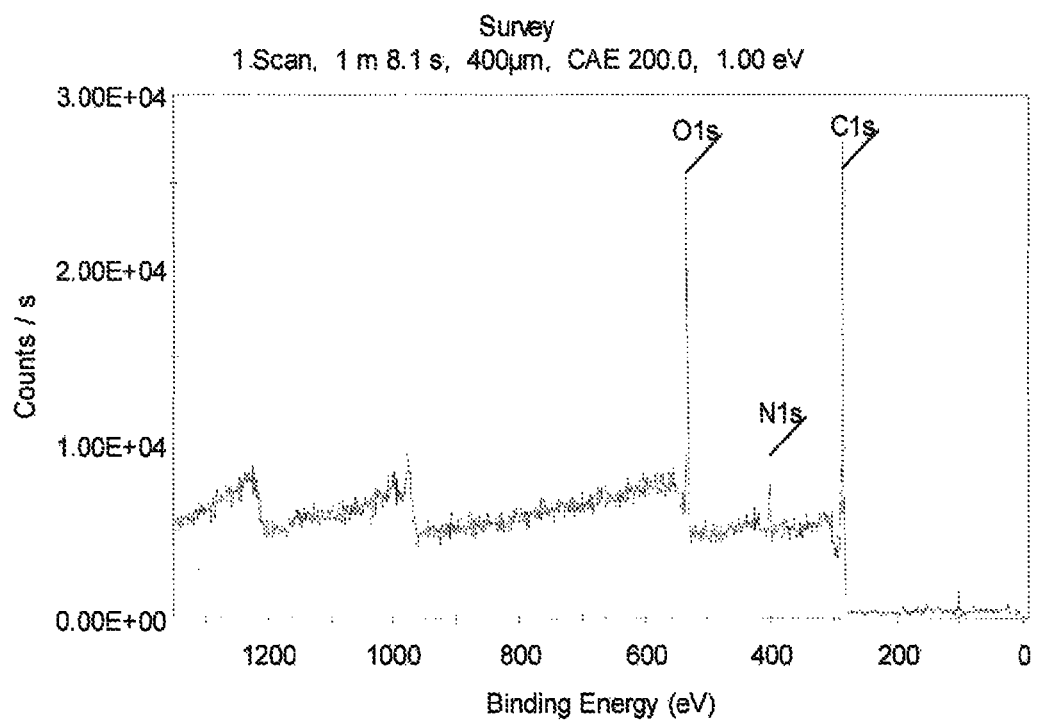
FIGS. 4(a) and 4(b) are graphical test results of XPS (X-ray photoelectron spectroscopy) surveys of ion beam treated charge dissipative polymeric surfaces of a thin film Kapton™ HN hydrocarbon polyimide, in accordance with embodiment of the present invention, and of a similar pristine (non-treated) reference polymeric surface, respectively.
Figure 4B:
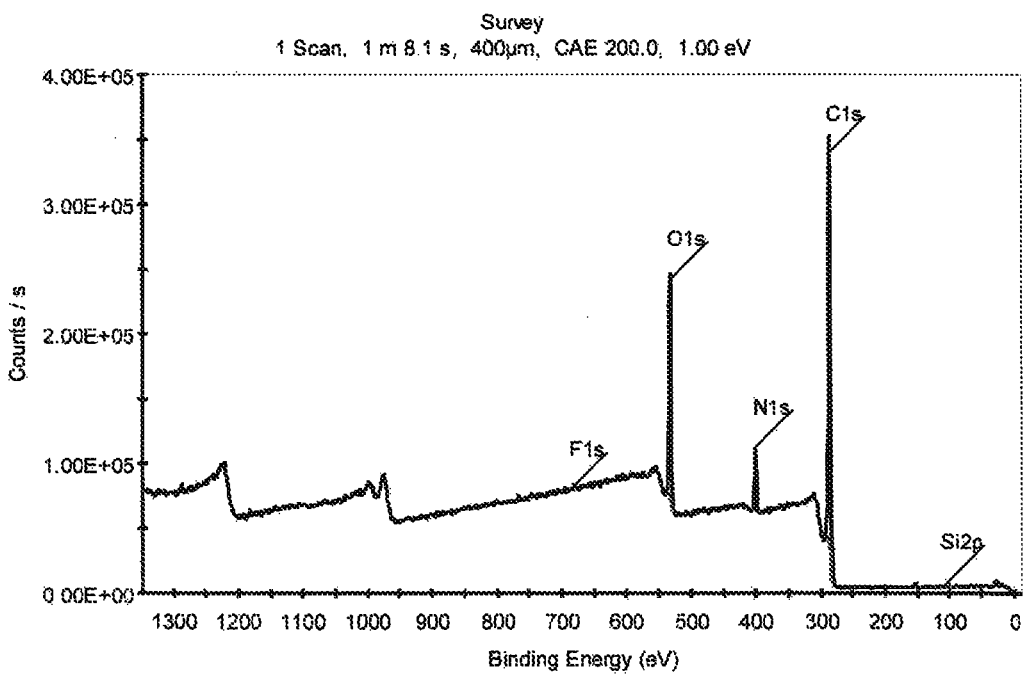

FIGS. 4a and 4b show XPS (X-ray photoelectron spectroscopy) survey scan results for ion beam treated Kapton™ HN and similar pristine (non-treated) reference sample, respectively. A comparison of those had clearly shown significant nitrogen depletion from Kapton™ hydrocarbon polyimide.

Figure 5A:
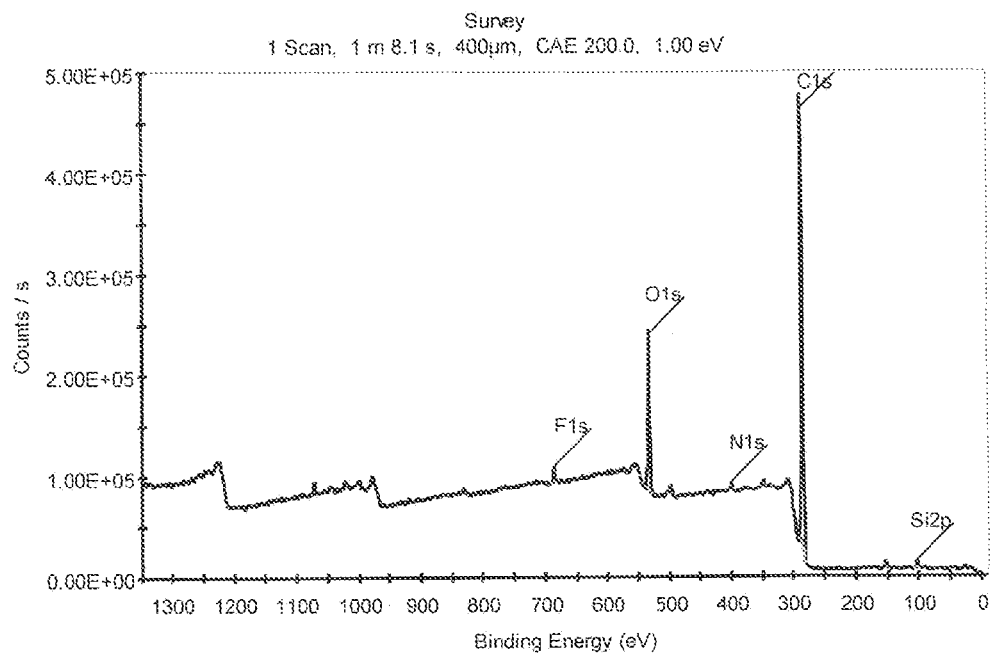
FIGS. 5(a) and 5(b) are graphical test results of XPS surveys of a charge dissipative polymeric surface of a thin film of Clear Polyimide CP1 (partially fluorinated material), ion beam treated in accordance with an embodiment of the present invention, and of a similar pristine non-treated polymeric surface, respectively.
Figure 5B:
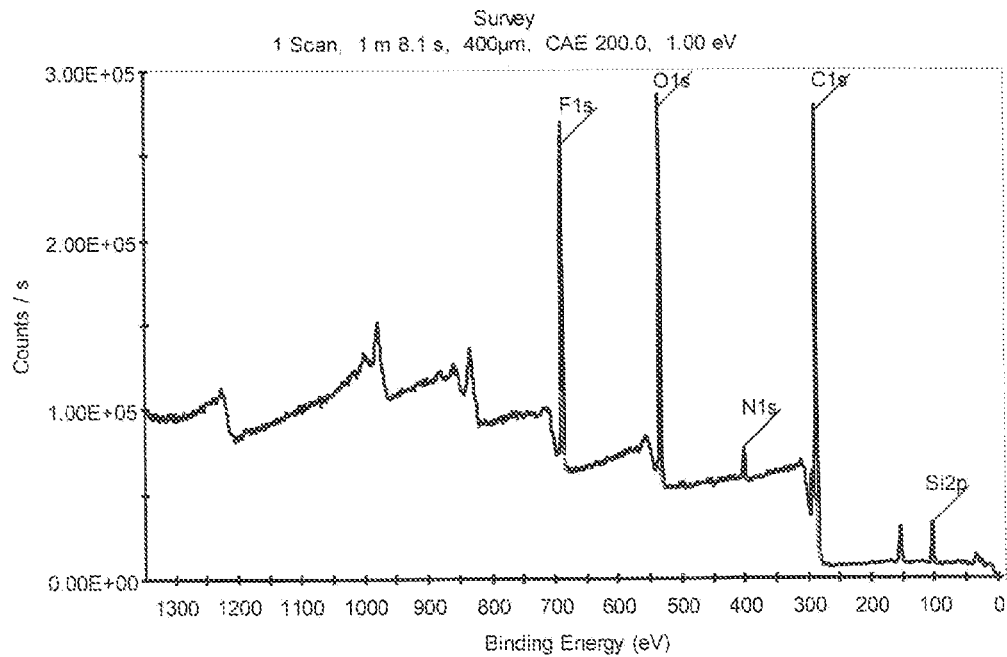

FIGS. 5a and 5b show XPS survey results and comparison of those for ion beam treated CP-1 sample and similar pristine non-treated reference sample, respectively, and have clearly shown significant nitrogen depletion and almost total depletion of fluorine from the partially fluorinated polyimide (CP-1).

Figure 6A:
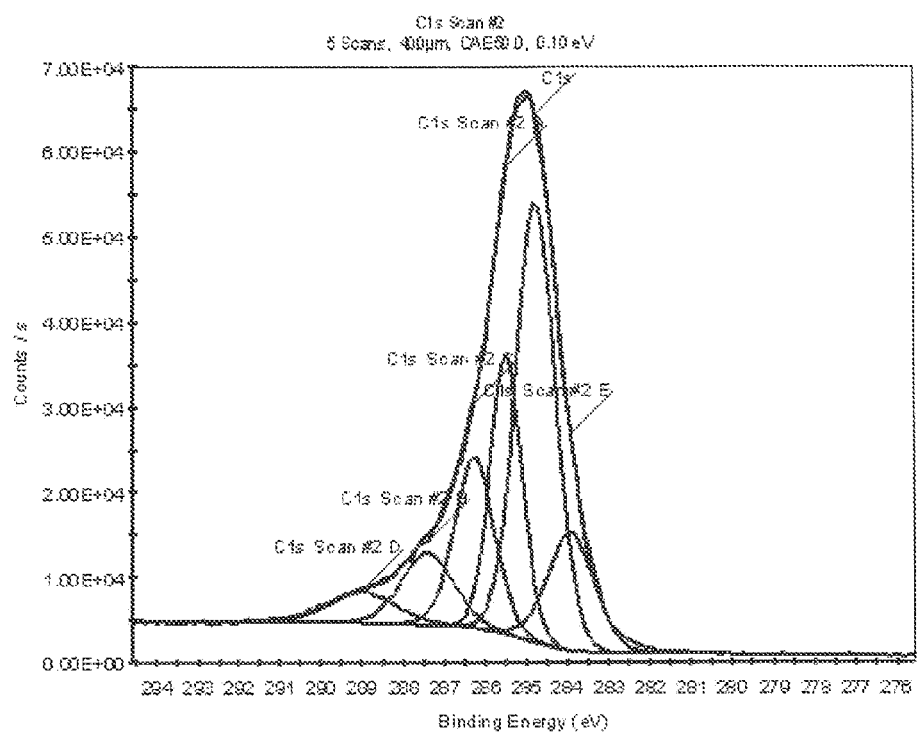
FIGS. 6(a) and 6(b) are graphical presentations of results of the high resolution XPS spectra de-convolution of carbon Cis bonding state of a charge dissipative polymeric surface, ion beam treated in accordance with an embodiment of the present invention, and of a similar pristine non-treated polymeric surface, respectively.
Figure 6B:
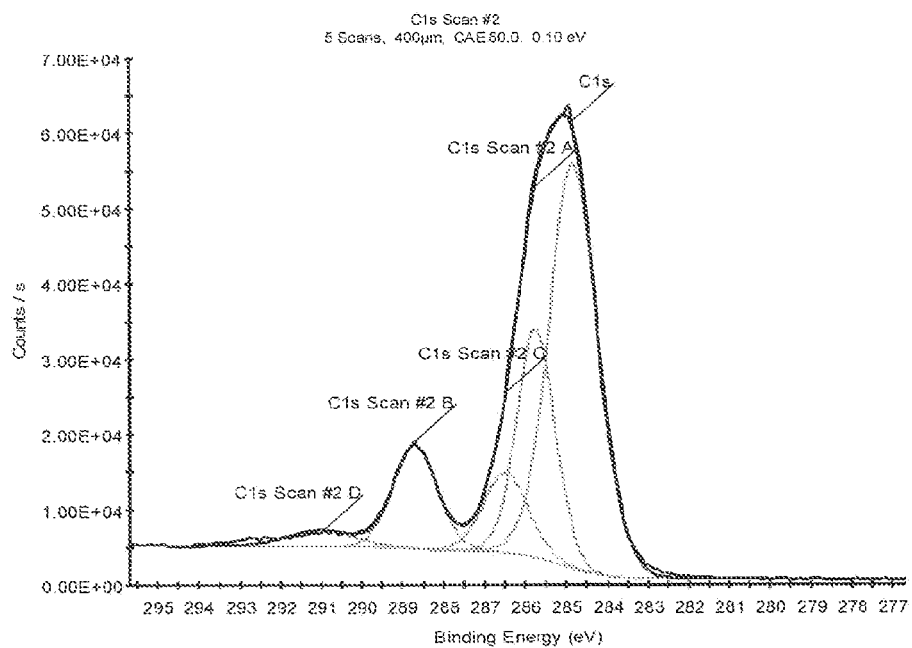

To understand better the chemical processes and reconstruction of the surface of ion beam treated polymers, the high-resolution XPS was conducted. FIGS. 6a and 6b represent the spectral de-convolution of C1s bonding states for ion-bombarded Kapton™ HN and pristine non-treated reference sample, respectively. The comparison of FIGS. 6a and 6b indicate all types of chemical bonding reconstruction at the surface layer due to ion bombardment, from bonds destruction to bonding energy shifts and formation of new carbon-carbon bonding states, similar to those formed in vacuum deposited inorganic carbonaceous layers. Ion bombardment resulted in destruction and reconstruction of the polyimide main chemical groups on the surface. The high energy C1s peak at 285.7 eV that is present at FIG. 6b, disappeared at FIG. 6a, and three new peaks appeared . . . . The high-resolution Cis spectra of all Kapton™ HN films after ion bombardment displayed similar changes for all investigated conditions. The main peaks at 284.3-284.7 eV at FIG. 6a is indicative of formation of a highly carbonized or graphitized surface, similar to the surface layers, developed on many high-performance aromatic polymers at ion implantation with higher energies and lower doses. So, XPS new peak at 284.3-284.7 eV at FIG. 6a in the present case can be assigned to graphitic-like, carbonaceous surface structures, containing so-called "adventitious C".

Table 1a presents the results of surface resistivity (SR) measurements on 1 mil (25 μm) thick space polymer films, mentioned above, as well as CP-1 White, that clear CP-1 with added white pigments, after three different medium energy (8-30 keV in these cases) ion beam treatments at room temperature for surface modification/carbonization, two performed with $Ar^+$, and one with $Xe^+$. The $Ar^+$-ion treatments have been performed at higher—$Ar^+$(I)—and lower—$Ar^+$(II)—energies, so, the results illustrate both ion mass and ion beams energy influence.

TABLE 1a

Surface resistivity of space polymer films treated for surface carbonization at room temperature with moderate energy ion beams

| Materials/Surface treatment | Surface resistivity at room temperature, $\rho$, $\Omega$/sq | | |
|---|---|---|---|
| | $Xe^+$ | $Ar^+(I)$ | $Ar^+(II)$ |
| CP-1 White (sample 1) | $0.75 \cdot 10^7$ | $2.5 \cdot 10^8$ | $1.3 \cdot 10^7$ |
| CP-1 White (sample 2) | $0.8 \cdot 10^7$ | $3 \cdot 10^8$ | $3 \cdot 10^7$ |
| CP-1 (sample 1) | $0.6 \cdot 10^7$ | $5 \cdot 10^8$ | $1.3 \cdot 10^7$ |
| CP-1 (sample 2) | $0.75 \cdot 10^7$ | $5.2 \cdot 10^8$ | $6 \cdot 10^7$ |
| Kapton™100 HN (sample 1) | $1.5 \cdot 10^7$ | $5 \cdot 10^{10}$ | $3 \cdot 10^9$ |
| Kapton™100 HN (sample 2) | $1.3 \cdot 10^7$ | $3.5 \cdot 10^{10}$ | $1.9 \cdot 10^9$ |

Table 1b represents the functional thermal optical properties and surface resistivity of Kapton™ HN films, 1 mil and 3 mil thick, treated for surface carbonization by low-energy (3 keV) $Ar^+$ high-flux technological ion beams at selected temperatures in the range of 20-85° C. In this manufacturing feasibility confirmation study, the sizes of the surface treated films, both width and length, have been significantly extended, for instance, up to 0.4 m width and up to 2 m length of a treated sheet. The films temperature increase in the range from 20° C. to 85° C. due to heating by the intensive beam or additional heater in the vacuum chamber drastically enhanced the surface treatment productivity and treatment quality. Both results may be associated with thermal enhanced diffusion and outgassing of the final volatile products from the ion bombarded surface layers and, subsequently, enhanced surface carbonization. For instance, higher temperatures allow performing the ion beam treatment of Kapton™ 100 HN (1 mil film), Kapton™ 300HN (3 mil) and Kapton™ 500HN (5 mil) films of 40 cm width and 180 cm length in only 7-10 minutes, to achieve the production of charge-dissipative Kapton™ HN in an economically feasible manner.

TABLE 1b

Functional properties of Kapton ™ HN films treated by low-energy (3 keV) $Ar^+$ ion beam at selected temperatures

| Sample ID | Apparent Solar absorptance $\alpha_s$ (with Al backing) | | Apparent Thermal emittance $\epsilon$ (over gold standard) | | Surface resistivity (M$\Omega$/sq.) |
|---|---|---|---|---|---|
| | Pristine | $\Delta\alpha_s$ | Pristine | $\Delta\epsilon$ | |
| #11, 1 mil | 0.339 | 0.122 | 0.883 | 0.009 | 10-12 |
| #14, 3 mil | 0.497 | 0.013 | 0.880 | 0.003 | 5-6 |
| #15, 3 mil | 0.497 | −0.031 | 0.880 | 0.004 | 20-30 |
| #17, 1 mil | 0.339 | 0.138 | 0.883 | −0.002 | 130-150 |
| #18a, 3 mil | 0.497 | −0.003 | 0.880 | 0.004 | 2-3 |
| #18b, 3 mil | 0.497 | 0.016 | 0.880 | 0.008 | 0.5-0.7 |
| #19, 3 mil | 0.497 | −0.031 | 0.880 | 0.007 | 80-100 |
| #20, 1 mil | 0.339 | 0.088 | 0.883 | 0.008 | 15-20 |
| #21, 3 mil | 0.497 | 0.019 | 0.880 | 0.008 | 10-20 |

Table 2 represents the results of RF S-parameter measurements in waveguide at Ka-band of untreated and surface carbonized (medium energy ion beams treated) Kapton™ HN and CP-1 White. The differences between corresponding untreated and treated samples are within measurement uncertainty, so, the ion beam treatment has low or no impact (negligible impact) on RF properties of materials. Similar results have been achieved for all low energy ion beam treated films.

TABLE 2

RF performance of surface carbonized and pristine (untreated) polymers

| Sample ID | Description | Worst case meas. 26.5 to 41 GHz | |
|---|---|---|---|
| | | Insertion Loss dB | Return Loss dB |
| Kap-HN | Kapton ™100 HN (untreated) | 0.015 to 0.025 | 30 to 31 |
| K1 | Surface carbonized by ion-beam treatment Kapton ™100 HN | 0.015 | 31 |
| Wht CP-1 | White CP-1 (untreated) | 0.031 | 25 to 26 |
| CW3 CW4 | Surface carbonized by ion-beam treatment of white CP-1 | 0.015/ 0.048 | 25 |

Table 3 shows surface resistivity of thin (1 mil) Kapton™ 100HN films before and after GEO-simulating radiation testing, using simultaneously all three factors of GEO space environment, $p^+ + e^- +$UV exposure. The radiation exposure was done with high acceleration factor, making the testing equivalent of about 5-6 years in GEO orbit for $p^+$ and $e^-$ on the surface (the acceleration factor for UV did not exceed 2, i.e. performed at 2 eq. Sun for UV, not to cause surface cross-linking and overheating) of a pristine (non-treated) reference sample and a surface carbonized sample. These results show that surface-carbonized Kapton™ 100 HN has kept its surface resistivity almost unchanged (around $10^7$ $\Omega$/sq.) after this GEO simulated irradiation, that is equivalent to long-term, about 5-6 years of GEO space flight radiation exposure. Similar results showing the SR stability of the treated material after the nowadays required equivalent of 15 years of GEO space radiation exposure have also been received.

TABLE 3

Surface resistivity of Kapton ™ films before and after radiation testing

| Material | Treatment | SR ($\Omega$/sq.) | SR ($\Omega$/sq.), Rad. Tested |
|---|---|---|---|
| Kapton ™100 HN (1 mil) | Pristine | ~$10^{15}$ | more than $10^9$ |
| Kapton ™100 HN (1 mil) | Ion beam treated | $(13-25) \cdot 10^6$ | ~$18 \cdot 10^6$ |

Table 4 shows the power handling capability (local RF power density at which thermal runaway occurs) of surface carbonized material compared with typical germanium coated material, when tested in waveguide in vacuum at Ku-band.

TABLE 4

Power handling capability of surface carbonized and germanium-coated space materials at Ku-band

| Material | Local RF power density to initiate thermal runaway (MegaWatts/m 2) |
|---|---|
| Germanium coated Kapton ™ HN | 0.5 to 1.5 |
| Surface Carbonized Kapton ™ HN | ~5 |

The surface carbonization method of the present invention to achieve stable charge-dissipative surface could be useful for, but not limited to, the following space-related areas:

Antenna sunshields (over radiating elements and/or reflectors)
  To alleviate the known ESD concerns with semi-conductors coatings at cold temperatures (whenever colder than about −50° C./−100° C.)
  The other alternatives adequate for ESD over the entire temperature range all have higher RF impact.
Solar cells
  as a replacement to optically clear ESD coatings.
MLI (multi-layer insulation) materials
  uncoated polyimide is a ESD threat.
  other ESD coatings like ITO are fragile.
Second Surface Mirrors (SSMs)
  treatment of polymer instead of application of an optically clear ESD coating like ITO which is fragile.
Membrane antennas
  Many antenna constructions involve the usage of a polyimide film with a printed circuit. A ESD coating can be required on these antennas, which can be unpractical to apply and/or ineffective at cold temperatures (too high surface resistivity) and/or have too big RF impact.
Antenna radiating element supports
  A RF-transparent support is often required in radiating elements. To be RF transparent, these supports must be non-conductive, which poses an ESD threat. Surface carbonized polymers are a solution to this.
High power horn covers
  No material meeting the ESD requirements is currently available to use as a horn protective cover (sunshield and/or cover for contamination) for high frequency high power feeds (Ku-band at RF power above 1 kW and/or higher frequencies with high power densities). Indeed, a thermal runaway can occur with semi-conductors coatings like germanium since the conductivity of semi-conductors (and thus RF losses) increases significantly with temperature. The surface carbonized polymers are a possible solution to this since the conductivity is much more stable over temperature and can be tailored to the desired range.

The surface carbonization to achieve charge-dissipative surface could also be useful for non-space related applications. Indeed, untreated polymers will build-up static electricity charges, which is often a concern for handling or for performance of various electronic devices for which the polymer film is used as a substrate. Handling thin films of Kapton™ (or other polymers) for example can be difficult because the material will stick to itself or nearby surfaces due to static electricity. Having a charge-dissipative polymer would help resolve this and make the material easier to handle.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A method of making a charge dissipative and RF transparent surface of a dielectric polymeric material, said method comprising the step of controllably carbonizing the surface of the polymeric material in a vacuum environment through bombardment of the surface with a beam of rare gas ions having an energy between 2.5 keV and 30 keV, and a total ion fluence level in the range from $1\times10^{16}$ ion/cm$^2$ to $5\times10^{17}$ ion/cm$^2$, while heating up and maintaining the surface to a temperature varying between 65° C. and 95° C. during the bombardment, in order to achieve:
  a treated carbonized surface layer with a surface resistivity selectable in the charge dissipative range between $1\times10^{6}$ and $1\times10^{9}$ ohms/square;
  said treated carbonized surface layer being RF transparent.

2. The method of claim 1, wherein said rare gas ions are sourced from Argon, Krypton or Xenon.

3. The method of claim 1, wherein said treated carbonized surface layer has a thickness between about 0.02 μm and about 0.2 μm.

4. The method of claim 1, wherein said bombardment keeps the carbonized layer RF transparent at RF signal frequencies up to about 40 GHz.

5. The method of claim 1, wherein controllably carbonizing the polymeric surface enables to achieve a static-dissipative material surface with an RF signal power handling up to a density of at least about 5.0 MW/m$^2$.

6. The method of claim 1, wherein the energy of the rare gas ions, the total fluence and the treatment temperature are selected to form the static dissipative carbonized layer having a variable range hopping conductivity mechanism yielding a temperature dependence of its surface resistivity in the range of less than three orders of magnitude between about −150° C. and about +150° C.

7. The method of claim 1, wherein controllably carbonizing the polymeric surface enables to achieve a surface that is resistant to the Geostationary Orbit (GEO) space radiation environment for a duration up to 15 years.

* * * * *